US010802661B2

(12) United States Patent
Uhma et al.

(10) Patent No.: US 10,802,661 B2
(45) Date of Patent: Oct. 13, 2020

(54) SYSTEMS, METHODS, AND APPARATUSES FOR IMPLEMENTING IN-APP LIVE SUPPORT FUNCTIONALITY

(71) Applicant: salesforce.com, inc., San Francisco, CA (US)

(72) Inventors: Gavin Andrew Ross Uhma, Sydney (CA); Allen Jeremy Wright, Halifax (CA); Adam William Dennis, Dartmouth (CA); Nicholas Christopher Ksiezopolski, Halifax (CA)

(73) Assignee: salesforce.com, inc., San Francisco, CA (US)

( * ) Notice: Subject to any disclaimer, the term of this patent is extended or adjusted under 35 U.S.C. 154(b) by 742 days.

(21) Appl. No.: 15/055,488

(22) Filed: Feb. 26, 2016

(65) Prior Publication Data

US 2016/0179298 A1 Jun. 23, 2016

Related U.S. Application Data

(63) Continuation of application No. 14/320,391, filed on Jun. 30, 2014, now Pat. No. 9,294,719.

(51) Int. Cl.
*G06F 3/0481* (2013.01)
*H04N 7/14* (2006.01)
(Continued)

(52) U.S. Cl.
CPC .......... *G06F 3/0481* (2013.01); *G06F 3/0487* (2013.01); *G06F 3/167* (2013.01);
(Continued)

(58) Field of Classification Search
CPC ........ G06F 9/4446; G06F 3/048; G06F 3/167; G06F 3/1454–1462; G06F 2203/0383;
(Continued)

(56) References Cited

U.S. PATENT DOCUMENTS 5,577,188 A 11/1996 Zhu
5,608,872 A 3/1997 Schwartz et al.
(Continued)

OTHER PUBLICATIONS

"Salesforce.com Unveils the Future of Mobile App Support, Launches Salesfoce1 Service Cloud SOS," downloaded from http://www.salesforce.com/company/news-press/press-releases/2014/04/140424.jsp dated Apr. 14, 2014, 3 pages.
(Continued)

*Primary Examiner* — Liang Y Li
(74) *Attorney, Agent, or Firm* — Elliot, Ostrander & Preston, P.C.

(57) ABSTRACT

In accordance with disclosed embodiments, there are provided systems, methods, and apparatuses for implementing in-app live support functionality. According to a particular embodiment such an apparatus may be embodied by a user client device which includes, for example: a processor and a memory to execute instructions at the user client device; an application to execute upon the user client device via the processor and the memory; a graphical interface; an audio interface; a communications interface to communicatively link the user client device with a remote service over a network; the graphical interface to receive a user event within the application triggering a user initiated service call to the remote service via the network; the communications interface to receive an audio and video stream from the remote service via the network responsive to the triggering of the user initiated service call, the audio and video stream displaying at least video of a customer service agent and establishing two way audio communication between the user client device and the remote service; and wherein the communications interface further transmits audio captured at the user client device to the remote service and transmits a representation of the application as displayed via the
(Continued)

graphical interface of the user client device to the remote service. Other related embodiments are disclosed.

22 Claims, 10 Drawing Sheets

(51) Int. Cl.
  *H04L 12/18* (2006.01)
  *G06F 3/0487* (2013.01)
  *G06F 3/16* (2006.01)
  *H04L 29/06* (2006.01)
  *H04L 29/08* (2006.01)

(52) U.S. Cl.
  CPC ...... *H04L 12/1895* (2013.01); *H04L 65/4069* (2013.01); *H04L 67/16* (2013.01); *H04L 67/32* (2013.01); *H04N 7/147* (2013.01)

(58) Field of Classification Search
  CPC . G06F 2221/2149; H04L 12/18; H04L 65/40; H04L 67/16; H04L 67/38; H04L 67/32; H04L 29/06034; H04N 7/14; G06Q 10/10
  See application file for complete search history.

(56) References Cited

U.S. PATENT DOCUMENTS

| | | | |
|---|---|---|---|
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,289,976 B2 | 10/2007 | Kihneman et al. | |
| 7,340,411 B2 | 3/2008 | Cook | |
| 7,620,655 B2 | 11/2009 | Larsson et al. | |
| 8,966,374 B1* | 2/2015 | Hardebeck | H04L 67/36 715/740 |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachadran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0048233 A1* | 3/2004 | Matthews | G09B 7/00 434/350 |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2006/0002315 A1* | 1/2006 | Theurer | G06F 3/1454 370/261 |
| 2006/0010392 A1* | 1/2006 | Noel | H04N 7/15 715/759 |
| 2009/0177744 A1 | 7/2009 | Marlow et al. | |
| 2013/0169741 A1 | 7/2013 | Witt et al. | |

(56) References Cited

U.S. PATENT DOCUMENTS

| | | |
|---|---|---|
| 2014/0081950 A1 | 3/2014 | Rajan et al. |
| 2014/0129676 A1 | 5/2014 | Zeng et al. |
| 2014/0156756 A1 | 6/2014 | Ding et al. |
| 2014/0222931 A1 | 8/2014 | Hemar et al. |
| 2014/0258747 A1* | 9/2014 | Narayan .............. G06F 1/3287 713/320 |
| 2014/0270104 A1 | 9/2014 | O'Connor |
| 2014/0359462 A1 | 12/2014 | Khalil et al. |
| 2015/0106750 A1* | 4/2015 | Konami .............. G06Q 10/101 715/759 |
| 2015/0156327 A1 | 6/2015 | Van Buren et al. |
| 2015/0341399 A1* | 11/2015 | Lee ...................... H04L 65/403 715/255 |

OTHER PUBLICATIONS

Non-Final Office Action for U.S. Appl. No. 14/320,391 dated Jul. 22, 2015, 7 pages.

Notice of Allowance for U.S. Appl. No. 14/320,391 dated Nov. 13, 2015, 7 pages.

\* cited by examiner

US 10,802,661 B2

SYSTEMS, METHODS, AND APPARATUSES FOR IMPLEMENTING IN-APP LIVE SUPPORT FUNCTIONALITY

CLAIM OF PRIORITY

This divisional application is related to, and claims priority to, the non-provisional utility application entitled "SYSTEMS, METHODS, AND APPARATUSES FOR IMPLEMENTING IN-APP LIVE SUPPORT FUNCTIONALITY," filed on Jun. 30, 2014, having an application number of Ser. No. 14/320,391 and the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of computing, and more particularly, to systems, methods, and apparatuses for implementing in-app live support functionality. Such means may be implemented within the computing architecture of a hosted computing environment, such as an on-demand or cloud computing environment which utilizes multi-tenant database technologies, client-server technologies, traditional database technologies, or other computing architecture in support of the hosted computing environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Mobile applications operating on popular mobile platforms such as iOS, Android, Windows Mobile, Blackberry, etc., provide a means by which to execute mobile applications. However, conventional solutions fail to provide a means by which support may readily be provided to users of such mobile applications in a simple and seamless manner.

For instance, conventional support methodologies for users of mobile applications and the businesses which support them include a user navigating to a separate website outside of the mobile application at issue, and sometimes on a different computing device, locating a website, locating a help or support section of the website, initiating a trouble ticket, and then describing via email or a web form what the problem is that the user encountered with the particular mobile application.

Even the most popular mobile applications which provide an in-app support button or link merely launch a separate web browser to the correct URL where a user may then provide a text description of the problem encountered.

The present state of the art may therefore benefit from the systems, methods, and apparatuses for implementing in-app live support functionality as is described herein.

BRIEF DESCRIPTION OF THE DRAWINGS

Embodiments are illustrated by way of example, and not by way of limitation, and will be more fully understood with reference to the following detailed description when considered in connection with the figures in which.

DETAILED DESCRIPTION

Figure 1:
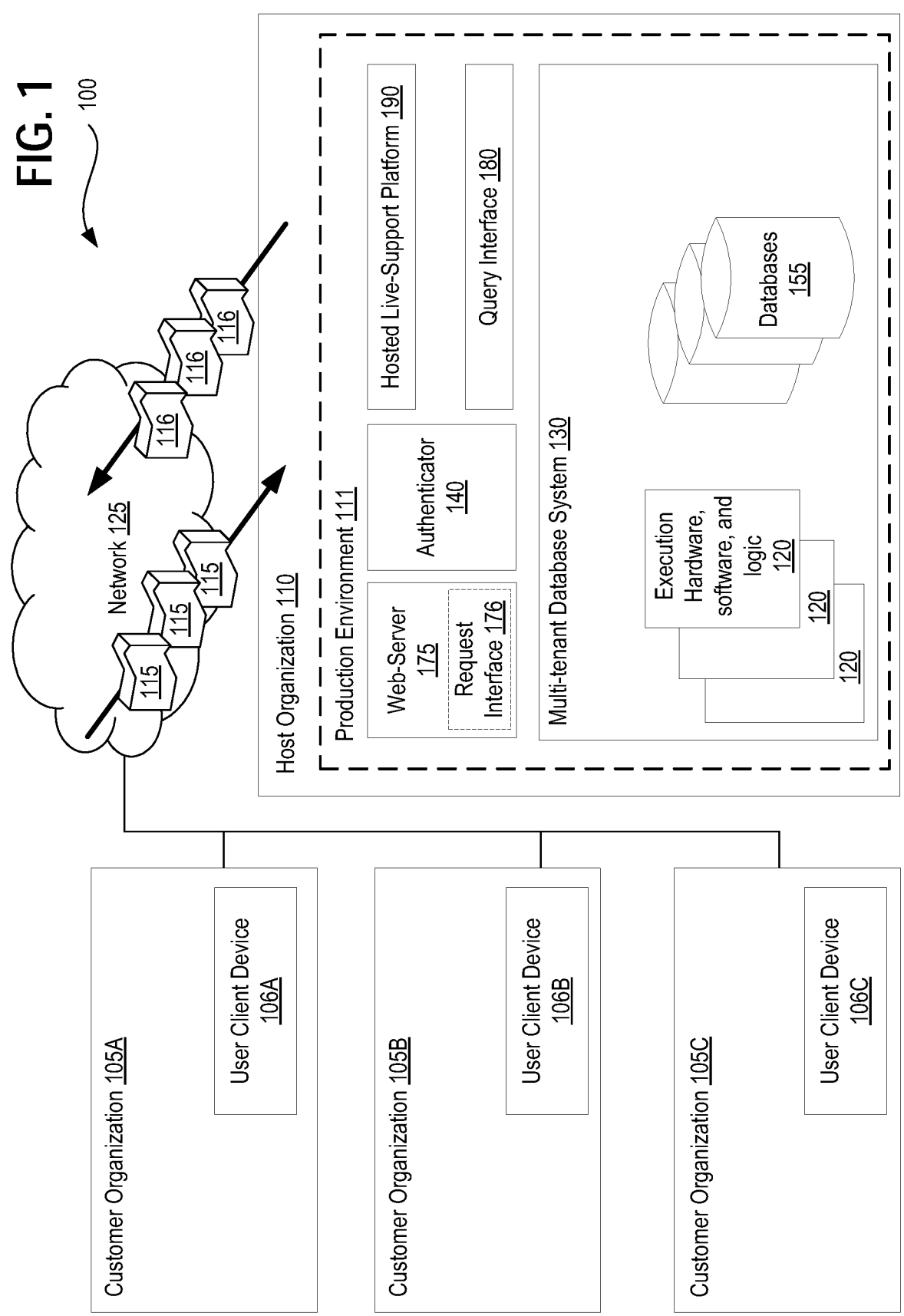
FIG. 1 depicts an exemplary architecture in accordance with described embodiments.

Described herein are systems, methods, and apparatuses for implementing in-app live support functionality. An exemplary embodiment may be embodied by a user client device which includes, for example: a processor and a memory to execute instructions at the user client device; an application to execute upon the user client device via the processor and the memory; a graphical interface; an audio interface; a communications interface to communicatively link the user client device with a remote service over a network; the graphical interface to receive a user event within the application triggering a user initiated service call to the remote service via the network; the communications interface to receive an audio and video stream from the remote service via the network responsive to the triggering of the user initiated service call, the audio and video stream displaying at least video of a customer service agent and establishing two way audio communication between the user client device and the remote service; and in which the communications interface further transmits audio captured at the user client device to the remote service and transmits a representation of the application as displayed via the graphical interface of the user client device to the remote service.

Certain embodiments operate within a hosted computing environment, also referred to as a provider of on-demand services, on-demand database services, cloud computing services, or simply a host organization that provides services to subscribing customer organizations. Such host organizations utilize various technologies to service many different tenants (e.g., customer organizations and their users) simultaneously. Such technologies may include, for example, client-server implementations, computing grids, computing pods or pools of work machines, traditional databases, single tenancy database systems and/or multi-tenant database systems. A multi-tenant database system in particular operates to store data on behalf of a multitude of subscribers, each being a "tenant" of the database system, hence the term multi-tenant database system. Many subscribers (e.g., users or tenants) utilize the computing technologies of the host organization to access analytics, charts, views, reports, and other such data which is stored within the servers, systems, databases, and multi-tenant database system of the host organization. For instance, a sales team may utilize sales data stored within such a system or customers may generally submit data to be stored within the system and execute search queries against such a system, in which case the system returns search results.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 depicts an exemplary architecture 100 in accordance with described embodiments. In one embodiment, a production environment 111 is communicably interfaced with a plurality of user client devices 106A-C (e.g., such as mobile devices, smart phones, tablets, PCs, etc.) through host organization 110. In one embodiment, a multi-tenant database system 130 includes databases 155, for example, to store tables, datasets, and underlying database records with user data on behalf of customer organizations 105A-C (e.g., tenants of the multi-tenant database system 130 or their affiliated users). In alternative embodiments, a client-server computing architecture may be utilized in place of the multi-tenant database system 130 or alternatively, a computing grid, or a pool of work servers, or some combination of hosted computing architectures may be utilized to carry out the computational workload and processing demanded of the host organization 110.

The multi-tenant database system 130 depicted in the embodiment shown includes a plurality of underlying hardware, software, and logic elements 120 that implement database functionality and a code execution environment within the host organization 110. In accordance with one embodiment, multi-tenant database system 130 further implements databases 155 to service database queries and other data interactions with the databases 155. The hardware, software, and logic elements 120 of the multi-tenant database system 130 are separate and distinct from a plurality of customer organizations (105A, 105B, and 105C) which utilize the services provided by the host organization 110 by communicably interfacing to the host organization 110 via network 125. In such a way, host organization 110 may implement on-demand services, on-demand database services or cloud computing services to subscribing customer organizations 105A-C.

Host organization 110 receives input and other requests 115 from a plurality of customer organizations 105A-C via network 125 (such as a public Internet). For example, incoming search queries, database queries, API requests, interactions with displayed graphical user interfaces and displays at the user client devices 106A-C, or other inputs may be received from the customer organizations 105A-C to be processed against the multi-tenant database system 130, or such queries may be constructed from the inputs 115 for execution against the databases 155 or the query interface 180, pursuant to which results 116 are then returned to an originator or requestor, such as a user of one of a user client device 106A-C at a customer organization 105A-C.

The host organization 110 provides support for a hosted live-support platform 190 in accordance with a particular embodiment which enables two-way audio intercommunication with the user client devices 106A-C to support in-application live support functionality from an application running at the user client devices 106A-C be they mobile devices such as smart phones and tablets or laptop computers or other such devices. The host organization 110 additionally provides a query interface 180 capable of receiving and executing requested queries against the databases and storage components of the multi-tenant database system 130 so as to return a result set, response, or other requested data in furtherance of the methodologies described.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

In one embodiment, requests 115 are received at, or submitted to, a web-server 175 within host organization 110. Host organization 110 may receive a variety of requests for processing by the host organization 110 and its multi-tenant database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 125 on behalf of the query interface 180 and for providing a web-based interface or other graphical displays to an end-user user client device 106A-C or machine originating such data requests 115.

Host organization 110 may implement a request interface 176 via web-server 175 or as a stand-alone interface to receive requests packets or other requests 115 from the user client devices 106A-C. Request interface 176 further supports the return of response packets or other replies and responses 116 in an outgoing direction from host organization 110 to the user client devices 106A-C.

Authenticator 140 operates on behalf of the host organization to verify, authenticate, and otherwise credential users attempting to gain access to the host organization.

Query interface 180 additionally provides functionality to pass queries from web-server 175 into the multi-tenant database system 130 for execution against the databases 155 for processing search queries, or into the other available data stores of the host organization's production environment 111. In one embodiment, the query interface 180 implements an Application Programming Interface (API) through which queries may be executed against the databases 155 or the other data stores.

Figure 2:
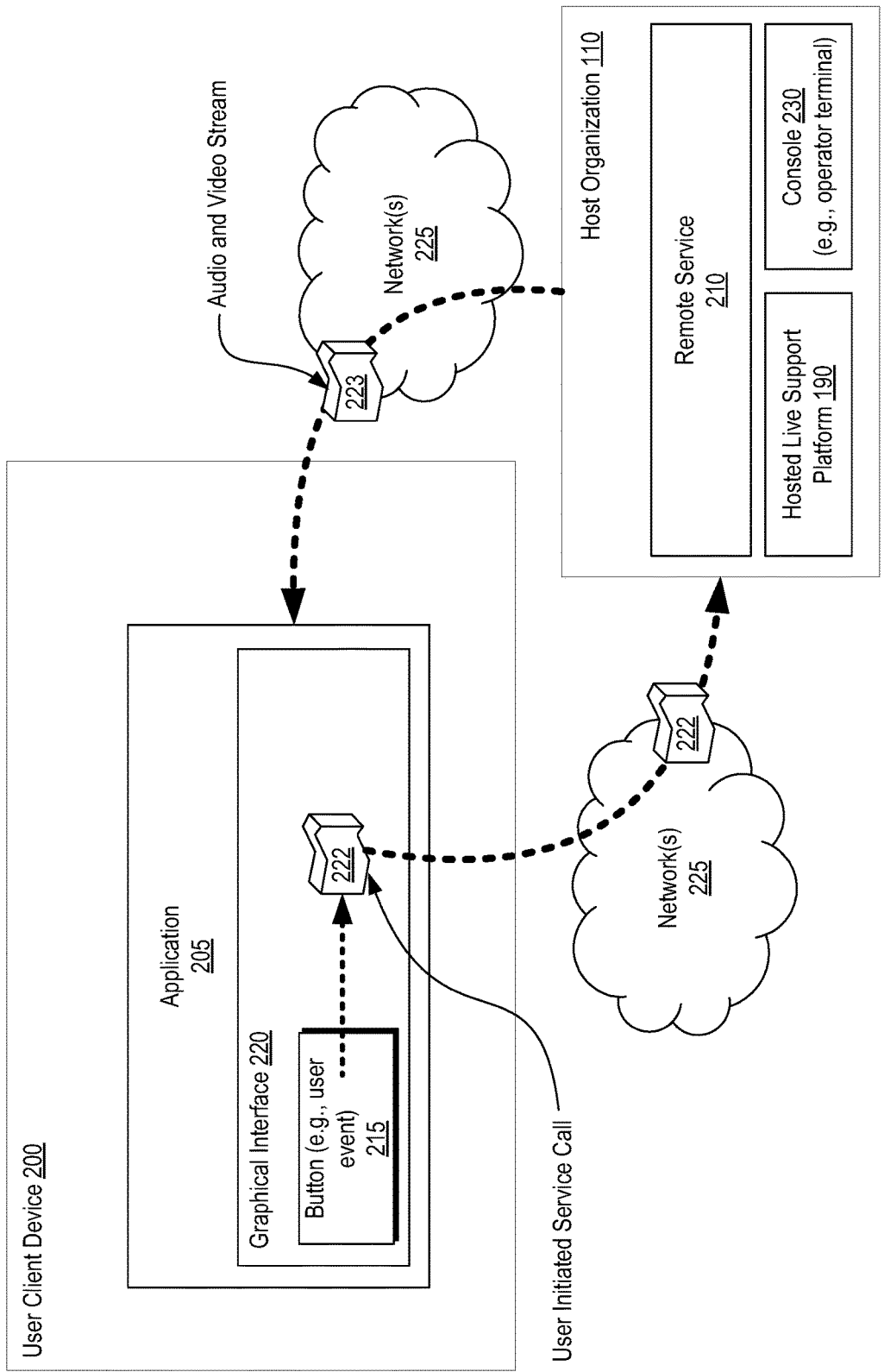
FIG. 2 depicts the user client device in additional detail.

FIG. 2 depicts the user client device 200 (e.g., refer to user client devices 106A-C from FIG. 1) in additional detail. The host organization 110 is also shown here as implementing remote service 210.

Applications 205 execute on a variety of user client devices 200 including mobile devices such as smart phones and tablets. For mobile operating systems, Android and iOS have proven to be particularly popular and represent the vast majority of the mobile computing market. However, as popular as these operating systems may be, the applications that run or execute atop them have proven difficult to support from a usability standpoint. For instance, conventional offerings require that a user having issues with a given application utilize interfaces which are separate from the application in question.

The methodologies described herein to implement live in-application functionality enable users encountering with a particular problem in their application 205 to click button 215 or otherwise initiate a user event within the graphical interface 220 of the application 205 to summon the help of a customer service agent who can, in real-time and with a live interaction, assist the user with whatever problem is presented.

Such functionality triggers, pursuant to the button 215 click or other user event, a user initiated service call 222 which is passed from the user client device 200 through a network 225 to a remote service 210 which in this particular example is provided by and implemented by host organization 110.

With the help of the customer service agent the user may then show or explain to the customer service agent where the user is having trouble within the particular application 205 so as to solicit support in real-time and in a completely seamless manner, without having to exit or depart from the context of the application 205. The ability to provide seamless support is a significant benefit to the user and to user satisfaction generally as it is faster and more efficient as well as more intuitive to operate within the context of the existing application to solicit and receive the desired support. Conventional means required that a user exit the application and completely change applications and contexts to, for example, a web-browser where the application's support page may be loaded, then navigated to find a support link, which likely provided nothing more than an email address, requiring the user to then type up a detailed explanation of the problem and then hope that somebody replies to the request for assistance via return email at some date in the future. Sometimes the application's support personnel are monitoring error logs for the application and may detect some anomaly, but again, this does nothing for the user seeking immediate assistance.

Conversely, in accordance with described embodiments, a user having initiated the service call (e.g., element 222) will be connected with a customer service agent through the remote service 210 of whom the user may then inquire as to the problem, ask questions in real-time, show the application in question as well as the current state of the graphical interface 220 to the customer service agent, and engage in two-way dialog and communication with the customer service agent such that the user may be seamlessly aided through resolving the problem at hand all within the existing context of the application 205 in question.

Additionally depicted is an audio and video stream 223 returned from the remote service 210 of the host organization and transmitted/returned to the application 205 at the user client device 200.

A real time collaborative experience is created with and for the user in which the user is able to very quickly see the customer support agent, see their face, speak real-time with the customer service agent via a two-way audio connection, as well as show to the customer service agent where precisely within the application 205 the user is having trouble. More particularly, the audio and video stream 223 returned from the remote service 210 enables the application 205 to depict a visual likeness of the customer service agent at the user's client device 200. For instance, a communications interface of the user client device 200 receives the audio and video stream 223 from the remote service 210 via the network 225 responsive to the triggering of the user initiated service call 222 (e.g., by pressing the button 215 or some other user event), in which the audio and video stream 223 displays at least video of a customer service agent and establishes the two way audio communication between the user client device 200 and the remote service.

The button 215 may be thought of as an SOS type button to initiate a distress call to a remote resource, for instance, the user needing help and thus triggering a request for assistance from the remote service 210 configured to receive the user initiated service call 222 and if requested, then to connect with the user in real-time to address the problem at hand.

According to certain embodiments, the host organization 110 provides a hosted live-support platform 190 which enables developer(s) of the application 205 in question to include the SOS button 215 or other configured user event detectable by the user client device 200 configured to responsively trigger the user initiated service call 222 according to, for example, a button press, click event, or other relevant user event. When triggered, the user initiated service call 222 travels through the cloud to the host organization 110, such as an implementing server or other system. In other embodiments, developers of the application 205 are enabled to include a native application button, a web link, a web page button, etc., so as to trigger the user initiated service call 222.

According to certain embodiments, upon receipt of the user initiated service call 222 at the remote service 210, the user initiated service call 222 is passed to a service cloud console 230 from which the customer service representative is able to accept the user initiated service call 222. For instance, the user initiated service call 222 may arrive as an email, a pop up, a telephone call, a video teleconferencing interface, etc., which actively listens for the incoming user initiated service call 222 from any one of potentially a great many of distinct users.

In certain embodiments, the user initiated service call 222 may be placed into a queue or may be answered immediately. In certain embodiments, regardless of whether the user initiated service call 222 is queued or not, upon having the customer service agent accept the call, the user will be notified via the user client device 200 that the customer service agent is joining the call (e.g., joining a common session, such as a co-browsing session or equivalent functionality on a mobile device; for instance, notification may occur via a pop up, sound, or other notification event. In certain optional embodiments, the user, despite having made the request, may have the further option to confirm acceptance of the customer service agent joining the call or common session, which may be particularly helpful in the event of a queue or queue time (e.g., hold time) in the event that the remote service and the persons responsible for staffing support for the application 205 in question permit queue times to exceed a certain threshold, such as a 30 second, 1 minute, 2 minute, or other configurable delay.

According to one embodiment, when the customer service agent joins the common session or call, both the user (e.g., via the user client device 200) and the customer service agent are placed into a common co-browse session.

According to a particular embodiment, once both the user and the customer service agent are both within a common session or call, a communications interface of the user client device 200 transmits audio captured at the user client device to the remote service and transmits a representation of the application as displayed via the graphical interface 220 of the user client device 200 to the remote service 210. Stated differently, two-way audio communication is enabled and additionally, the representation of the application 205 as displayed at the user client device 200 is provided to the customer service agent to view what is presently happening on the user's screen.

According to certain embodiments, there is a video capture device at the console 230 capable of capturing a likeness of the customer service agent which is then returned by the remote service 210 to the user client device 200 for display. For instance, a moving video or a still image of the customer service agent may be displayed to the user within the application 205, for instance, within movable pop up box, or as an overlay to the application 205 in a corner, etc.

In certain embodiments, the customer service agent cannot see the customer, regardless of whether a video capture device exists at the user client device 200. In other embodiments, each of the user's likeness and the customer service agent's likeness are shared via respective video capture devices, thus enabling the customer service agent to "see" or perceive the user and visa versa with the user being able to "see" or perceive the customer service agent. Such functionality may be left to the discretion of the developers or opened for configuration directly by a user who may set such choices and controlling parameters within an appropriate settings screen.

According to certain embodiments, the user of the user client device 200 is able to move the graphical element depicting the customer service agent's likeness around within the graphical interface 220. For instance, the graphical element containing the customer service agent's likeness may be a floating box that is resizable and/or movable within the graphical interface 220 established by the application 205, thus permitting the user to move it out of the way of the Application's GUI elements if need be, or even minimize, close, or hide it entirely at the user's discretion.

According to certain embodiments, the representation of the application 205 as displayed via the graphical interface 220 of the user client device 200 is transmitted or returned from the user client device 200 to the customer service agent via the remote service 210 in the form of moving video in accordance with any of the accepted conventions (e.g., mpeg, avi, mov, mp4, mkv, etc.) whereas with other embodiments the representation of the application 205 as displayed at the graphical interface 220 is limited to screen changes in which elements that are repainted upon changes in the user's view at the user client device 200 causing the GUI to repaint are transmitted to the remote service. Yet another acceptable alternative is for the application 205 to transmit a series of stills to the remote service. Regardless, the representation of the application 205 as displayed via the graphical interface 220 of the user client device 200 provides to the customer service representative a view of precisely what the user "sees" or perceives via the graphical interface 220 local to the user client device 200. In certain embodiments the customer service representative's own likeness provided to the user client device 200 via the audio and video stream 223 is also returned with the representation, whereas in other embodiments it is not included with such a representation.

According to certain embodiments, the customer service representative is able to move a cursor or pointing device which is displayed at the graphical interface 220 of the user client device to point to particular screen elements or objects or menu options or configuration settings, etc. In yet another embodiment, the customer service representative is able to draw onto the screen and graphical interface 220 of the user client device 200. For instance, the customer service representative may manipulate a cursor device at the console 230 which in turn communicates cursor movements, pointer movements, or free hand drawing marks which are then communicated to and received by the user client device 200. For instance, the user client device 200 receives drawing elements input at the console 230 or operator terminal by the customer service agent and those free hand drawing elements are then displayed on top of the application's graphical interface 220. Such drawing elements may be drawn by the customer service agent by clicking and drawing with a mouse or cursor device or with a stylus as though the customer service agent were drawing with a virtualized pencil onto the customer's screen.

According to a particular embodiment, both the user client device 200 and the console 230 are placed into a common session as enabled by the hosted live support platform 190 through which a customer service agent is granted permission to manipulate on-screen elements local to the user client device 200, be they pointers, cursors, menus, boxes, dialog confirmations, settings, etc. In such an embodiment, the representation of the application 205 as displayed via the graphical interface 220 of the user client device 200 is depicted via the console 230 at the remote service 210 and the coordinates are captured for any control inputs for the on-screen elements local to the user client device 200, pursuant to which the captured coordinates are then transmitted from the console 230 to the hosted live support platform 190 where they are then communicated to the user's client device 200 and applied locally to the graphical interface 220 via the application 205. For instance, the application 205 may provide an API or other appropriate means by which to communicate the coordinates to the local user client device 200 to then be applied to the graphical interface 202 as though the foreign actions were generated locally.

In certain embodiments, the customer service agent is enabled to see and partially manipulate a given on-screen element, but not fully utilize or control it. For instance, it may be that a customer service agent is enabled to "see" a particular text box displayed as well as click on and highlight text within it, potentially even copying the text, but the customer service agent may nevertheless be restricted not on the basis of a given graphical element, but rather, as sub-feature of the element, such as write permission in this particular example.

According to other embodiments, various security features are implemented by the developers of the application 205 as supported by the hosted live support platform 190 so as to protect the privacy of the user at the user client device 200. For instance, certain applications may contain sensitive or personal information. Such information may be of financial nature, medical, or just personal and private information that a user simply prefers not to share with or expose to the customer service representative. Accordingly, certain embodiments map areas of the screen and then designate mapped elements as open or close or private and not private, such that some areas may be permissibly shared with the customer service agent within the representation that is returned from the user client device to the remote service 210 while preventing other mapped elements from being displayed to the customer service agent via the console 230. A variety of options for shielding or hiding or protecting information may be employed, such as blacking out certain areas, blurring certain areas, not displaying the graphical element thus causing missing graphical display element at the console 230 when viewed by the customer service agent, etc. Another alternative is to display a ciphered or encrypted version of text, such that text remains in the correct location but its value is meaningless to the observing customer service agent at the console 230. Notably, the user can "see" or perceive the plain text and original format in its normal form whereas the customer service agent may be restricted from seeing the plain text or the un-encrypted format for text and images.

In certain embodiments, the user may dictate which elements are private and non-private, and there may be default but configurable settings to control these choices within the application 205. Other times, users have no control and must reply upon a developer to make the appropriate selections. Other times, data conforming to certain specified fields or masks, or patterns may be obfuscated in some way (e.g., a social security number may be detected by its length, make up, and format, and then upon detection of the corresponding mask, the data may be scrambled, blacked out, blurred, etc.) from view of the customer service agent while remaining viewable to the user of the client user device.

In one embodiment, all photographs are by default, blurred, blacked out, or restricted from being shared with the representation of the application 205 as displayed via the graphical interface 220 of the user client device 200. The user of the user client device 200 may then optionally cause the application 205 to share them, for instance, by changing a setting or clicking on the photo and responding to a dialog prompt requesting permission to share the photo with the customer service agent, etc.

In such a way, the customer service agent is provided via the representation with as accurate of a depiction of the user's experience of the application 205 at the user client device 200 as feasible while simultaneously accommodating a user's pragmatic needs for information privacy. Encryption schemes and encrypted tunneling may additionally be utilized to protect the sensitivity of the communications and audio and video stream 223 at the discretion of the developer of the application 205 or provided and made to be configurable by a user of the user client device 200. For instance, it may be provided that all traffic between the user client device 200 and the remote service 210 must pass through a fully encrypted path to ensure a complete chain of trust for such communications.

According to one embodiment, a drag and drop solution is provided to the application's 205 developer which permits the developer to specify what aspects of the screen or graphical interface 220 to be shared to a customer service agent merely by clicking, dragging, and dropping the appropriate visual elements into a corresponding designation, such as a hide/show box, etc. Where the graphical interface 220 is made up of multiple distinct components, each may have a property or attribute which controls whether they are shared with the customer service agent or hidden, or configurable away from a default, etc. For separate distinct graphical elements, it is possible to simply not render certain elements or a sub-set of the graphical elements to the customer service agent rather than obfuscating them through blurring, blocking out, etc. Alternatively, screen coordinates or zones may be utilized to specify areas of privacy that are not to be shared with the customer service agent but which remains viewable to the user.

Navigation through the application 205 may be restricted to local control only in which the user must navigate through the screens and menus of the application but may converse with the customer service representative via the two way audio communication channel to ask questions and receive navigation guidance. In other instances, navigation may be opened up to, delegated, or exposed to the customer service agent via the console in which the customer service agent may manipulate the graphical interface 220 of the application 205 remotely thus causing navigation events to be communicated to the user client device 200 to have them be applied to and carried out by the application 205. In other embodiments, on a sub-set of navigation controls are exposed to the customer service agent via the console. As with the data that is shared, the navigation aspects may likewise be configurable by the user or may be set by the developer of the application 205.

According to one embodiment, the common session or call within which both the user of the user client device 200 and the customer service agent via the console 230 are concurrently viewing the state of the application 205 (e.g., the user locally via the graphical interface 220 and the customer service agent via the representation) may be terminated at any time by the user by activating a menu and selecting a termination option for the common session. For instance, clicking on the customer service agent's likeness as returned to the user client device 200 with the audio and video stream 223 may present a menu with an option to terminate the call, pursuant to which, activation of the option will terminate the call or common session immediately.

According to particular embodiments, additional diagnostics information is provided to the remote service including the customer service agent. Further still, in accordance with certain embodiments, the audio and video stream 223 is archived for subsequent use and analysis along with the diagnostics data thus documenting and providing an audit trail of everything that happened during the common session/call, including the two-way audio of the user and the customer service agent and anything that occurred on screen of the user's client device 200 which may include as well any drawing elements by the customer service agent as well as cursor and pointer movements originating at the console 230 and applied locally to the user client device 200. According to described embodiments, the diagnostics information may include data such as what operating system is running on the user's client device 200, the version of the application 205, the duration of the session, the size of the user client device's screen and resolution, a patch list, free memory, battery status, hardware identifier for the user client device 200, and any other information the developer of the application 200 considers to be of relevance and which is legitimately and technically obtainable by the application 205.

Figure 3A:
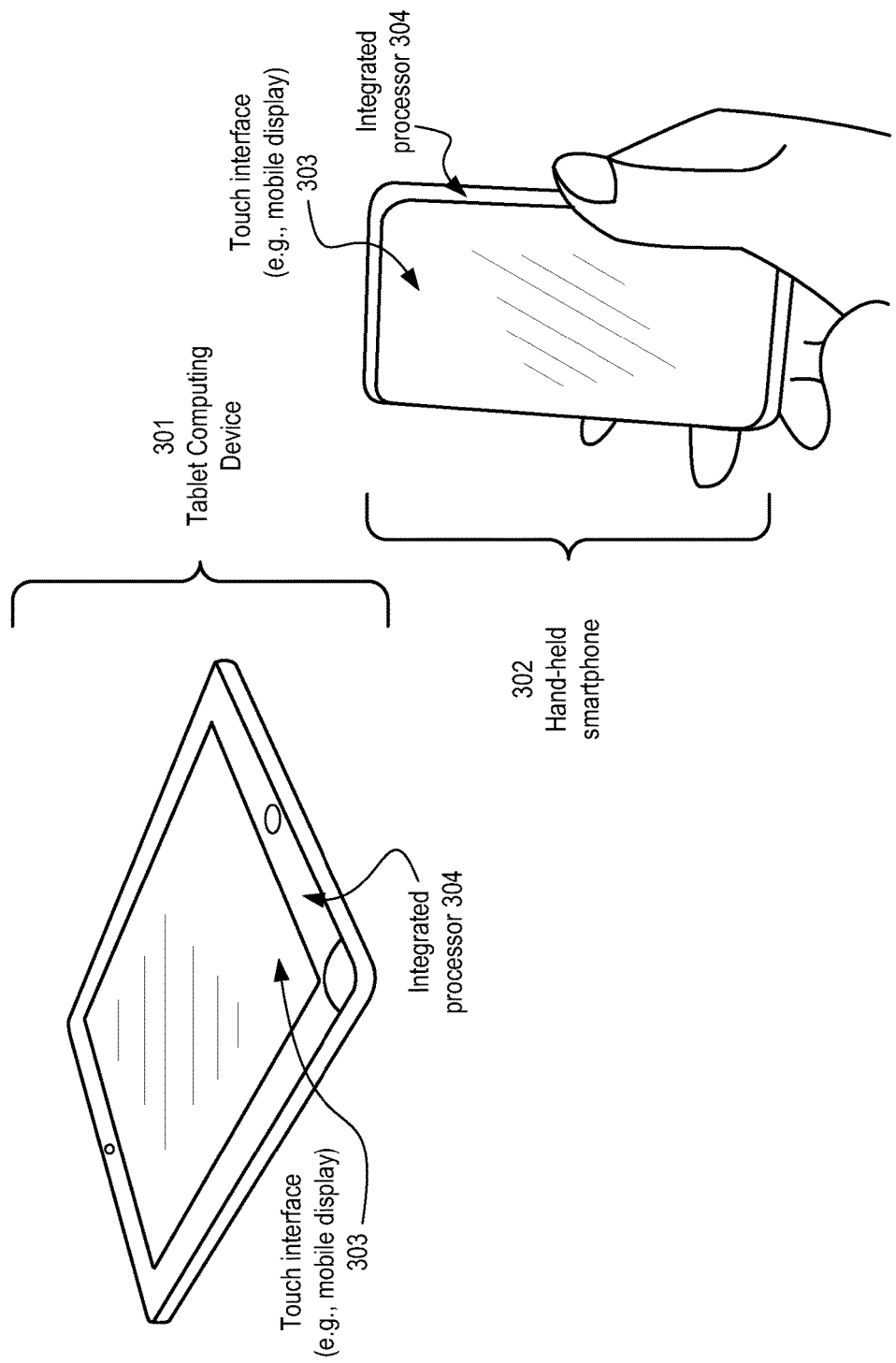
FIG. 3A depicts a tablet computing device and a hand-held smartphone each having a circuitry integrated therein as described in accordance with the embodiments.

FIG. 3A depicts a tablet computing device 301 and a hand-held smartphone 302 each having a circuitry integrated therein as described in accordance with the embodiments. As depicted, each of the tablet computing device 301 and the hand-held smartphone 302 include a touch interface 303 (e.g., a touchscreen or touch sensitive display) and an integrated processor 304 in accordance with disclosed embodiments.

For example, in one embodiment, a system embodies a tablet computing device 301 or a hand-held smartphone 302, in which a display unit of the system includes a touchscreen interface 303 for the tablet or the smartphone and further in which memory and an integrated circuit operating as an integrated processor are incorporated into the tablet or smartphone, in which the integrated processor implements one or more of the embodiments described herein. In one embodiment, the integrated circuit described above or the depicted integrated processor of the tablet or smartphone is an integrated silicon processor functioning as a central processing unit (CPU) and/or a Graphics Processing Unit (GPU) for a tablet computing device or a smartphone.

Figure 3B:
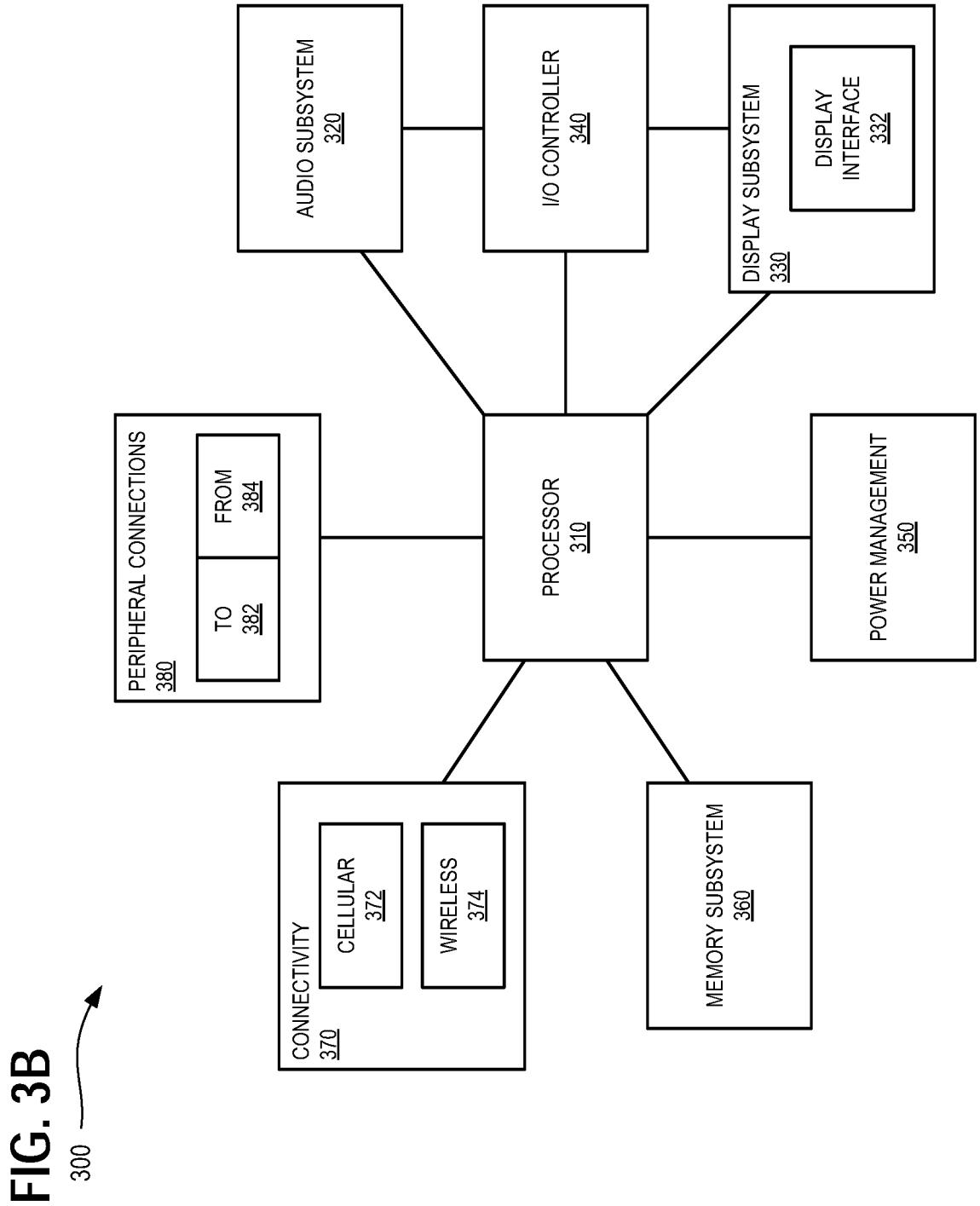
FIG. 3B is a block diagram of an embodiment of tablet computing device, a smart phone, or other mobile device in which touchscreen interface connectors are used.

FIG. 3B is a block diagram 300 of an embodiment of tablet computing device, a smart phone, or other mobile device in which touchscreen interface connectors are used. Processor 310 performs the primary processing operations. Audio subsystem 320 represents hardware (e.g., audio hardware and audio circuits) and software (e.g., drivers, codecs) components associated with providing audio functions to the computing device. In one embodiment, a user interacts with the tablet computing device or smart phone by providing audio commands that are received and processed by processor 310.

Display subsystem 330 represents hardware (e.g., display devices) and software (e.g., drivers) components that provide a visual and/or tactile display for a user to interact with the tablet computing device or smart phone. Display subsystem 330 includes display interface 332, which includes the particular screen or hardware device used to provide a display to a user. In one embodiment, display subsystem 330 includes a touchscreen device that provides both output and input to a user.

I/O controller 340 represents hardware devices and software components related to interaction with a user. I/O controller 340 can operate to manage hardware that is part of audio subsystem 320 and/or display subsystem 330. Additionally, I/O controller 340 illustrates a connection point for additional devices that connect to the tablet computing device or smart phone through which a user might interact. In one embodiment, I/O controller 340 manages devices such as accelerometers, cameras, light sensors or other environmental sensors, or other hardware that can be included in the tablet computing device or smart phone. The input can be part of direct user interaction, as well as providing environmental input to the tablet computing device or smart phone.

In one embodiment, the tablet computing device or smart phone includes power management 350 that manages battery power usage, charging of the battery, and features related to power saving operation. Memory subsystem 360 includes memory devices for storing information in the tablet computing device or smart phone. Connectivity 370 includes hardware devices (e.g., wireless and/or wired connectors and communication hardware) and software components (e.g., drivers, protocol stacks) to the tablet computing device or smart phone to communicate with external devices. Cellular connectivity 372 may include, for example, wireless carriers such as GSM (global system for mobile communications), CDMA (code division multiple access), TDM (time division multiplexing), or other cellular service standards). Wireless connectivity 374 may include, for example, activity that is not cellular, such as personal area networks (e.g., Bluetooth), local area networks (e.g., WiFi), and/or wide area networks (e.g., WiMax), or other wireless communication.

Peripheral connections 380 include hardware interfaces and connectors, as well as software components (e.g., drivers, protocol stacks) to make peripheral connections as a peripheral device ("to" 382) to other computing devices, as well as have peripheral devices ("from" 384) connected to the tablet computing device or smart phone, including, for example, a "docking" connector to connect with other computing devices. Peripheral connections 380 include common or standards-based connectors, such as a Universal Serial Bus (USB) connector, DisplayPort including MiniDisplayPort (MDP), High Definition Multimedia Interface (HDMI), Firewire, etc.

Figure 3C:
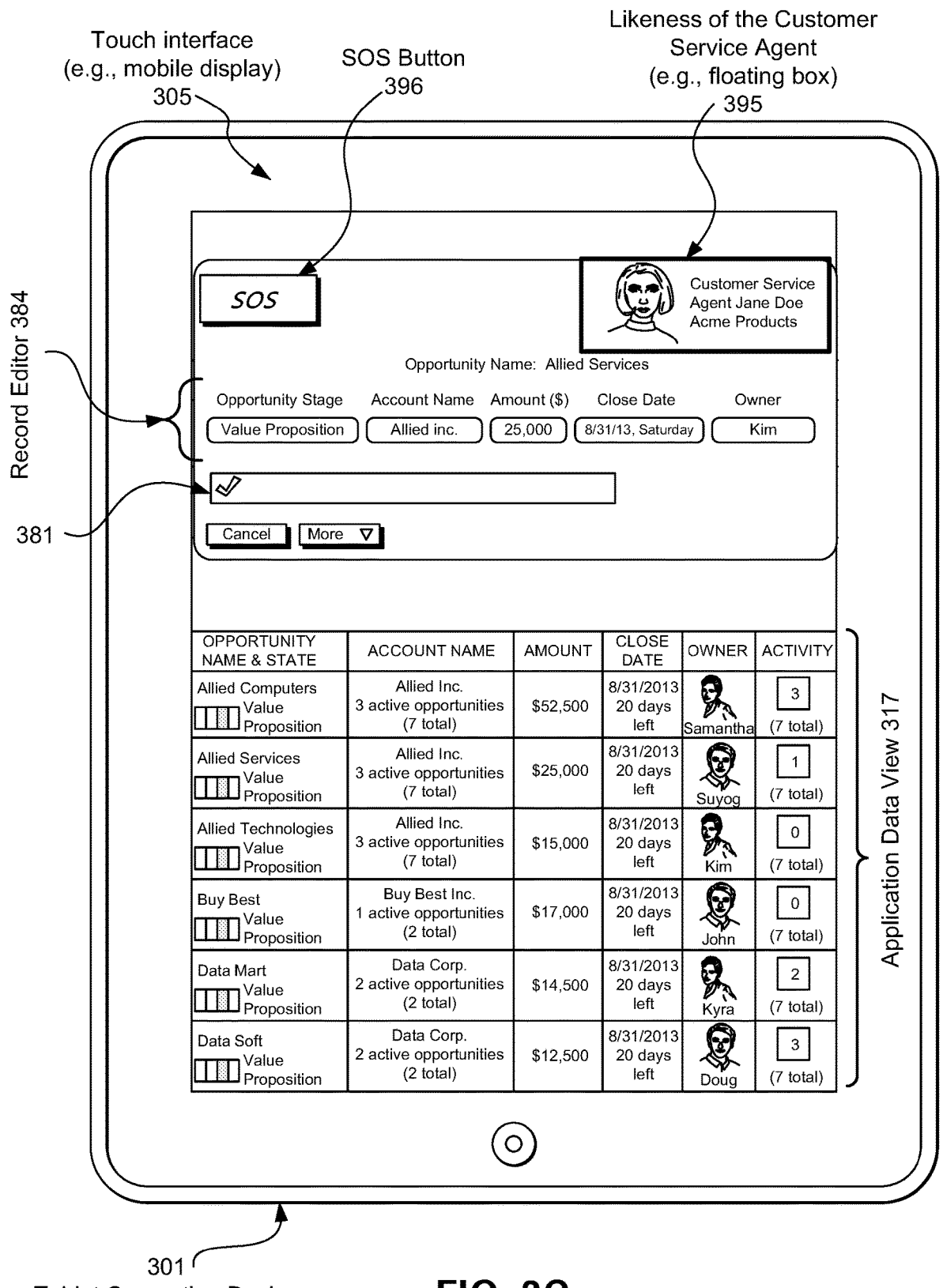
FIG. 3C depicts an exemplary graphical interface operating at a mobile, smartphone, or tablet computing device in accordance with the embodiments.

FIG. 3C depicts an exemplary graphical interface operating at a mobile, smartphone, or tablet computing device 301 in accordance with the embodiments. In particular, there is depicted a tablet computing device 301 having embodied therein a touch interface 305, such as a mobile display. Presented or depicted to the mobile display 305 is the application data view 317 in which various records, data elements, or other information of interest to the user of the particular application are depicted to the user via the touch interface/mobile display 305. Various navigation elements and manipulatable graphical elements are depicted here, such as record editor 384, drop down navigation menu 381, the SOS button 396 (or any other element capable of receiving a user event so as to trigger the user initiated service request), and lastly the likeness of the customer service agent (e.g., within a moveable and sizable floating box according to some embodiments) as set forth at element 395.

It is within this context that the various embodiments are employed. For instance, the tablet computing device 301 (or any other user client device) is utilized to execute the application and display the graphical interface described previously (e.g., such as element 220 of FIG. 2). The SOS button or other user event triggers a user initiated service request that is communicated via the tablet computing device's 301 communication interface to the remote service which then is accepted by a customer service agent such as "Jane Doe" depicted here causing a video capture device at an operator terminal or console to capture the likeness of the customer service agent and return an audio and video stream to the tablet computing device 301 causing establishment of the two-way audio communication between the user and the customer service agent and the user as well as the customer service agent's likeness to be displayed locally to the user of the tablet computing device 301 (e.g., via floating box graphical element 395 as depicted). The representation of the touch interface/mobile display 305 is additionally returned to the remote service such that the customer service agent may "see" or perceive what is going on at present at the user's local tablet computing device 301 so as to be able to aid or assist the user in real time. As described, certain elements may be blocked or obfuscated. The customer service agent may draw upon the user's screen to be depicted locally at the touch interface/mobile display 305, despite being originated remotely, or a cursor/pointer may be manipulated by the customer service agent remotely for local display to the user at the tablet computing device 301, etc.

Figure 4:
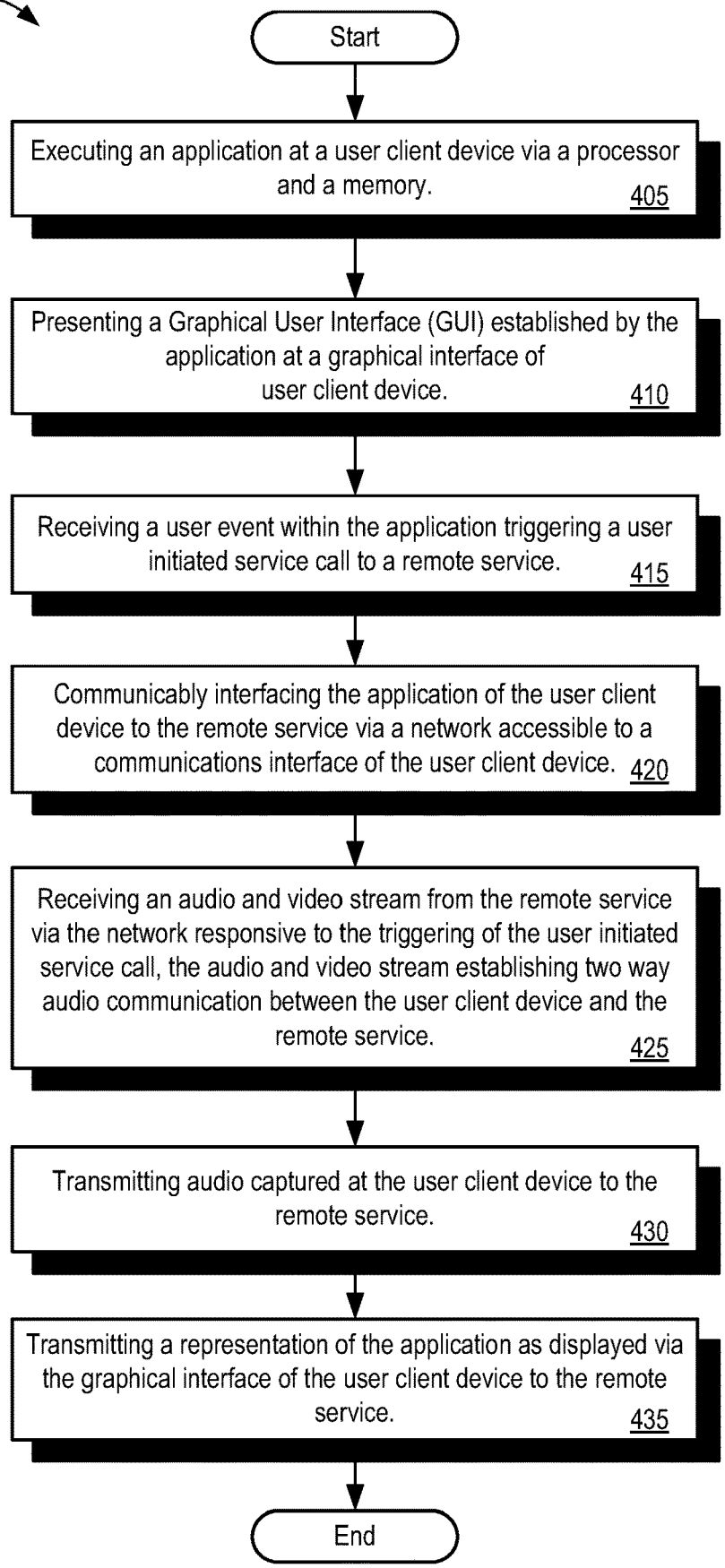
FIG. 4 is a flow diagram illustrating a method for implementing in-app live support functionality in accordance with disclosed embodiments.

FIG. 4 is a flow diagram illustrating a method 400 for implementing in-app live support functionality in accordance with disclosed embodiments. Method 400 may be performed by processing logic that may include hardware (e.g., circuitry, dedicated logic, programmable logic, microcode, etc.), software (e.g., instructions run on a processing device) to perform various operations such as executing, presenting, receiving, interfacing, communicating, receiving, transmitting, querying, encrypting, decrypting, processing, providing, determining, triggering, displaying, retrieving, updating, sending, returning, etc., in pursuance of the systems and methods as described herein. For example, user client devices 106A-C as depicted at FIG. 1, the user client device 200 as depicted at FIG. 2, the system 500 at FIG. 5, the user system 612 at FIGS. 6A and 6B respectively, or the machine 700 at FIG. 7, may implement the described methodologies. Some of the blocks and/or operations listed below are optional in accordance with certain embodiments. The numbering of the blocks presented is for the sake of clarity and is not intended to prescribe an order of operations in which the various blocks must occur.

At block 405, processing logic executes an application at a user client device via a processor and a memory. For instance, embodiments corresponding to an apparatus may implement the described methodologies via the user client device which includes and operates with the benefit of at least a processor and a memory.

At block 410, processing logic presents a Graphical User Interface (GUI) established by the application at a graphical interface of user client device.

At block 415, processing logic receives a user event within the application triggering a user initiated service call to a remote service.

At block 420, processing logic communicably interfaces the application of the user client device to the remote service via a network accessible to a communications interface of the user client device.

At block 425, processing logic receives an audio and video stream from the remote service via the network responsive to the triggering of the user initiated service call, the audio and video stream establishing two way audio communication between the user client device and the remote service.

At block 430, processing logic transmits audio captured at the user client device to the remote service.

At block 435, processing logic transmits a representation of the application as displayed via the graphical interface of the user client device to the remote service.

In accordance with a particular embodiment, there is non-transitory computer readable storage media having instructions stored thereon that, when executed by a processor of a user client device, the instructions cause the user client device to perform operations including: executing an application at the user client device via the processor and the memory; presenting a Graphical User Interface (GUI) established by the application at a graphical interface of user client device; receiving a user event within the application triggering a user initiated service call to a remote service; communicably interfacing the application of the user client device to the remote service via a network accessible to a communications interface of the user client device; receiving an audio and video stream from the remote service via the network responsive to the triggering of the user initiated service call, the audio and video stream displaying at least video of a customer service agent and establishing two way audio communication between the user client device and the remote service; transmitting audio captured at the user client device to the remote service; and transmitting a representation of the application as displayed via the graphical interface of the user client device to the remote service.

Figure 5:
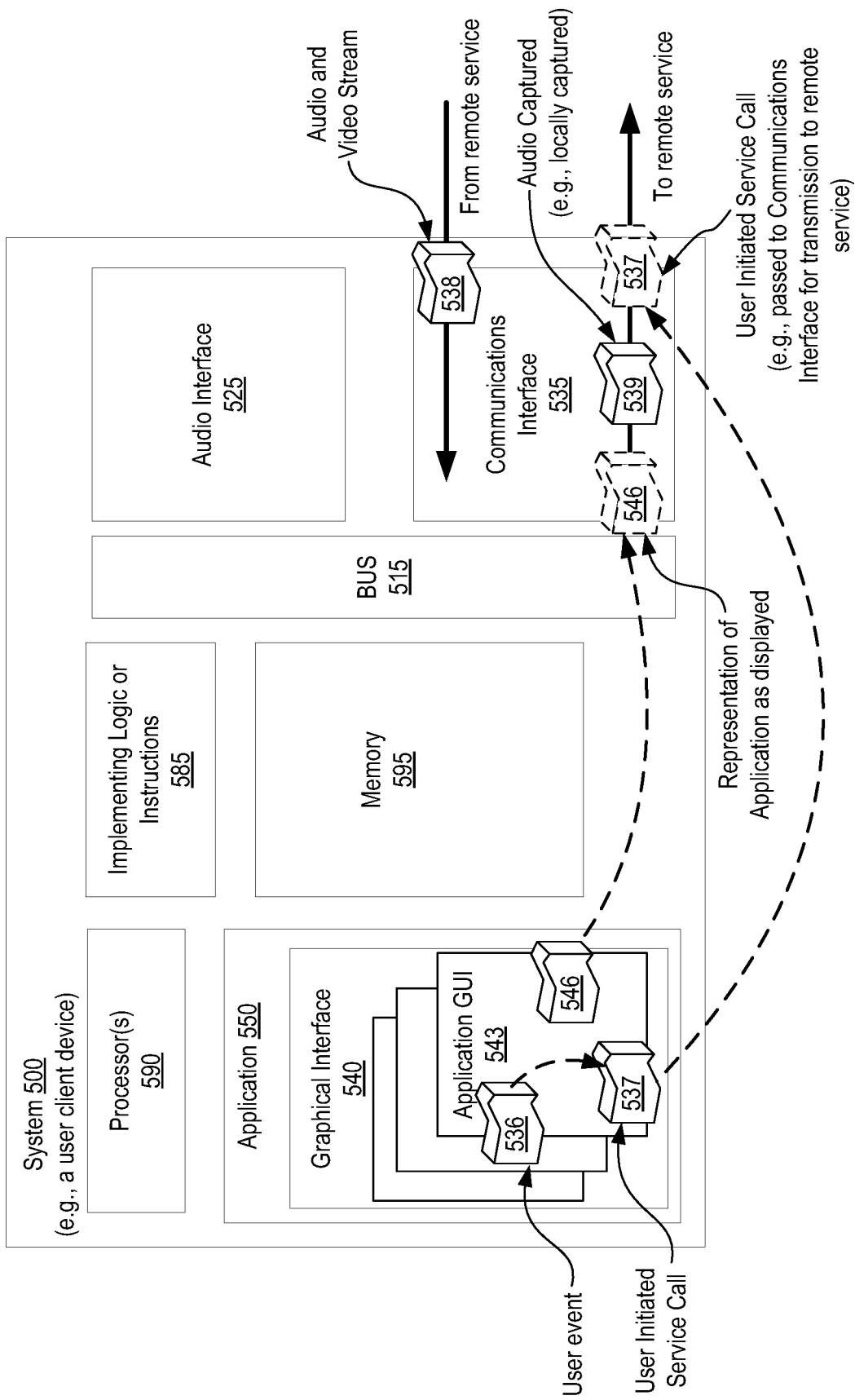
FIG. 5 shows a diagrammatic representation of a system in accordance with which embodiments may operate, be installed, integrated, or configured.

FIG. 5 shows a diagrammatic representation of a system 500 (e.g., a user client device) within which embodiments may operate, be installed, integrated, or configured. In accordance with one embodiment, there is a system 500 having at least a processor 590 and a memory 595 therein to execute implementing logic and/or instructions 585. Such a system 500 may communicatively interface with and cooperatively execute with the benefit of a hosted computing environment, such as a host organization, a multi-tenant environment, an on-demand service provider, a cloud based service provider, a client-server environment, etc.

According to the depicted embodiment, the system 500 (e.g., embodying the user client device) includes the processor 590 and the memory 595 to execute instructions at the system 500; an application 550 to execute upon the user client device (e.g., embodied by the system 500) via the processor 590 and the memory 595; a graphical interface 540; an audio interface 525; a communications interface 535 to communicatively link the user client device with a remote service over a network; the graphical interface 540 to receive a user event 536 within the application 550 (e.g., via an application GUI for example), the user event 536 triggering a user initiated service call 537 to the remote service via the network; the communications interface 535 to receive an audio and video stream 538 from the remote service via the network responsive to the triggering of the user initiated service call 537, the audio and video stream 538 displaying at least video of a customer service agent and establishing two way audio communication between the user client device and the remote service; and in which the communications interface 535 further transmits audio captured 539 at the user client device to the remote service and transmits a representation of the application as displayed 546 via the graphical interface 540 of the user client device to the remote service.

According to another embodiment of system 500 (e.g., a user client device), the graphical interface to receive the user event within the application triggering the user initiated service call to the remote service via the network includes: the application to send a request to the remote service via the communications interface; the remote service to receive the request from the user client device and responsively display the request at an operator terminal of the remote service; the request to be accepted at the operator terminal of the remote service; and in which the communications interface to receive the audio and video stream from the remote service via the network responsive to the triggering of the user initiated service call includes the communications interface to receive the audio and video stream from the remote service contingent upon the request having been accepted at the terminal of the remote service.

According to another embodiment of system 500 (e.g., a user client device), the user initiated service call to the remote service includes a user initiated SOS type distress call requesting service, assistance, or support from the remote service.

According to another embodiment of system 500 (e.g., a user client device), the graphical interface to receive the user event within the application includes: the graphical interface to display an SOS button as a component of a Graphical User Interface (GUI) established by the application; and the graphical interface to receive a click, touch, swipe, or other user gesture event at the SOS button displayed programmatically triggering the user initiated service call to the remote service. However, it is not necessary to utilize an "SOS button" per se, or even a button at all, as a great variety of graphical elements and non-graphical elements may constitute a user event which in turn triggers the user initiated service request.

According to another embodiment of system 500 (e.g., a user client device), the communications interface to receive an audio and video stream from the remote service via the network includes: the communications interface to receive the video stream and the graphical interface to display upon the user client device a live video feed of a customer service representative affiliated with the remote service.

According to another embodiment of system 500 (e.g., a user client device), the live video feed of the customer service agent is superimposed within a movable overlay box on top of a Graphical User Interface (GUI) established by the application concurrently displayed by the graphical interface of the user device.

According to another embodiment of system 500 (e.g., a user client device), the two way audio communication between the user client device and the remote service includes: the audio interface of the user client device emitting voice communication of a customer service representative captured at an operator terminal of the remote service and transmitted to the user client device within the audio and video stream; and the audio interface of the user client device further capturing voice communication of a user captured by the audio interface of the user client device for transmission to the operator terminal at the remote service within the audio and video stream.

According to another embodiment of system 500 (e.g., a user client device), the audio and video stream from the remote service is restricted to the two way audio communication only without video transmission or receipt within the audio and video stream when available transmission bandwidth accessible via the communications interface falls below a first threshold; in which the audio and video stream from the remote service is restricted to the two way audio communication with a still image or a sub-sampling of the video stream from the remote service when the available transmission bandwidth accessible via the communications interface falls below a second threshold; or alternatively in which the audio and video stream from the remote service is provided with the two way audio communication and the video stream in an unrestricted form when the available transmission bandwidth accessible via the communications interface is above a third threshold.

According to another embodiment, system 500 (e.g., a user client device) further includes: a video capture device to capture and transmit via the communications interface an outgoing video stream of a user as captured by the video capture device of the user client device for transmission to an operator terminal at the remote service concurrently with the two way audio communication established by the communications interface between the user client device and the remote service.

According to another embodiment of system 500 (e.g., a user client device), the user client device is embodied within one of a laptop computer, a mobile client device, a smartphone, or tablet client device, having integrated therewith a touch interface to display the graphical interface and to receive user input events. Computing devices lacking a "touch interface" may nevertheless be utilized in accordance with various embodiments so long as the user is able to interact with such computing devices, such as the user client devices described previously.

According to another embodiment of system 500 (e.g., a user client device), the communications interface communicates with the remote service via a public Internet; in which the remote service is implemented by a system at a host organization that serves as a cloud based service provider to the user client device; and in which the cloud based service provider hosts the application which is built within the host organization by or on behalf of a customer organization which is a tenant of the host organization and in which the cloud based service provider makes the application accessible to authorized users affiliated with the customer organization.

According to another embodiment of system 500 (e.g., a user client device), the communications interface establishing two way audio communication between the user client device and the remote service enables a user of the user client device and a customer service operator of the remote service to converse seamlessly through the user client device in the context of the application to resolve the user's issue with the application in real-time.

According to another embodiment of system 500 (e.g., a user client device), an operator terminal of the remote service displays a representation of a Graphical User Interface (GUI) established by the application at the user client device in real time at the remote service concurrently with the established two way audio communication between the client device and the remote service.

According to another embodiment of system 500 (e.g., a user client device), the operator terminal of the remote service which displays the representation of the GUI established by the application at the user client device receives drawing elements input at the operator terminal on top of the displayed representation of the GUI at the operator terminal; and in which the received drawing elements input at the operator terminal are transmitted back to the user client device via the communications interface for overlay and display at the GUI established by the application as displayed at the user client device. Such drawing elements may include free hand drawing marks generated by mouse movements, finger movements on a touch sensitive screen, or stylus movements on a pad or touch sensitive screen. For instance, the graphical interface may display drawing elements locally upon the user client device that originated remotely at the remote service. Such drawing elements may be displayed as overlay data on top of the GUI established by the application as displayed locally at the user client device.

According to another embodiment of system 500 (e.g., a user client device), the operator terminal of the remote service further displays a likeness of the user co-located with the user client device as captured by a video capture device integrated with the user client device and transmitted to the remote service for concurrent display with the representation of the GUI established by the application at the user client device.

According to another embodiment of system 500 (e.g., a user client device), the application displays a Graphical User Interface (GUI) established by the application at the user client device; in which the communications interface to transmit the representation of the application as displayed via the graphical interface of the user client device to the remote service includes masking, obfuscating, or blocking sub-elements of the GUI displayed at the user client device and in which the communications interface to transmit the representation of the application as displayed via the graphical interface includes transmitting the representation with the sub-elements of the GUI masked, obfuscated, or blocked; and further in which the application displays the GUI at the user client device without any sub-elements of the GUI masked, obfuscated, or blocked and in which the sub-elements of the GUI are only masked, obfuscated, or blocked from view at the remote service.

According to another embodiment of system 500 (e.g., a user client device), the application specifies what sub-elements of the GUI masked, obfuscated, or blocked as a security feature to protect sensitive customer data displayed at the user client device from being transmitted to the remote service.

According to another embodiment of system 500 (e.g., a user client device), the sub-elements of the GUI that are masked, obfuscated, or blocked are specified by a developer of the application or configurable by a user via a customizable configuration through the application at the user client device in advance of triggering of the user initiated service call to the remote service.

According to another embodiment of system 500 (e.g., a user client device), in which navigation and interactions of the application are controlled by user inputs provided at the user client device only without permitting the remote service navigable control over the application and its interactions at the user client device.

According to another embodiment of system 500 (e.g., a user client device), in which navigation and interactions of the application are controlled by user inputs provided at the user client device or remote inputs originated from the remote service, or both, wherein the user inputs or the remote inputs cause the application to responsively navigate through or interact with the graphical interface as displayed locally at the user client device. For instance, such interactions may include scrolling, buttons, inputs, and so forth.

According to another embodiment of system 500 (e.g., a user client device), in which a sub-set of navigable events are restricted from being instantiated via the remote inputs originated from the remote service to improve privacy and security of sensitive customer information accessible at the application of the user client device; and in which the sub-set of navigable events that are restricted from being instantiated via the remote inputs remain available for instantiation via the user inputs local to the user client device. Stated differently, provided is the ability to configure what a remote agent can, or cannot, interact with remotely, in a configurable manner for the sake of security and privacy of the user.

According to another embodiment of system 500 (e.g., a user client device), the communications interface is to further transmit diagnostic information to the remote service concurrently with the representation of the application as displayed via the graphical interface, the diagnostic information including any one or more of: diagnostic information about the user client device; information about network conditions between the user client device and the remote service, identity and version of operating system running on the user client device, version of the application, duration of a common session between the user client device and the remote service, size of the user client device screen and resolution, a patch list at the user client device, free memory at the user client device, battery status at the user client device, and hardware identifier for the user client device. According to described embodiments, diagnostic information is restricted to non-personal and non-private information such that it is not possible to uniquely identify later the user or the user client device.

According to another embodiment of system 500 (e.g., a user client device), the diagnostics information, the representation of the application as displayed via the user client device, and the and the audio and video stream displaying at least video of the customer service agent and the established two way audio communication between the user client device and the remote service are recorded and archived to storage at the remote service.

Bus 515 interfaces the various components of the system 500 amongst each other, with any other peripheral(s) of the system 500, and with external components such as external network elements, other machines, client devices, cloud computing services including those implemented by the remote service to which the arrows point to and arrive from, etc. Communications may further include communicating with such external devices via a network interface over a LAN, WAN, or the public Internet.

Figure 6A:
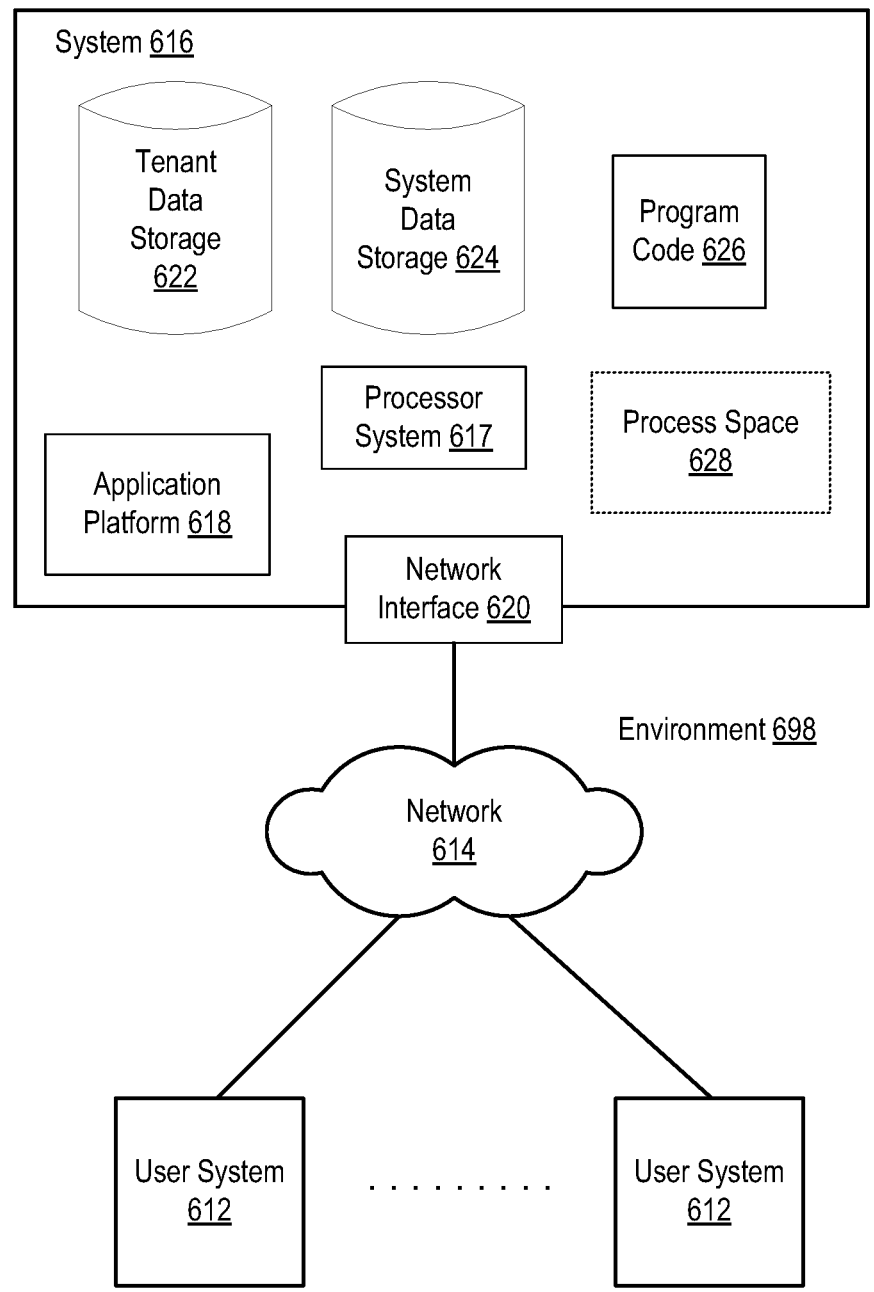
FIG. 6A illustrates a block diagram of an environment in which an on-demand database service may operate in accordance with the described embodiments.

FIG. 6A illustrates a block diagram of an environment 698 in which an on-demand database service may operate in accordance with the described embodiments. Environment 698 may include user systems 612, network 614, system 616, processor system 617, application platform 618, network interface 620, tenant data storage 622, system data storage 624, program code 626, and process space 628. In other embodiments, environment 698 may not have all of the components listed and/or may have other elements instead of, or in addition to, those listed above.

Environment 698 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6A (and in more detail in FIG. 6B) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" is used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6A, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6A, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6A include conventional, well-known elements that are explained only briefly here. For example, each user system 612 may include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units.

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6B:
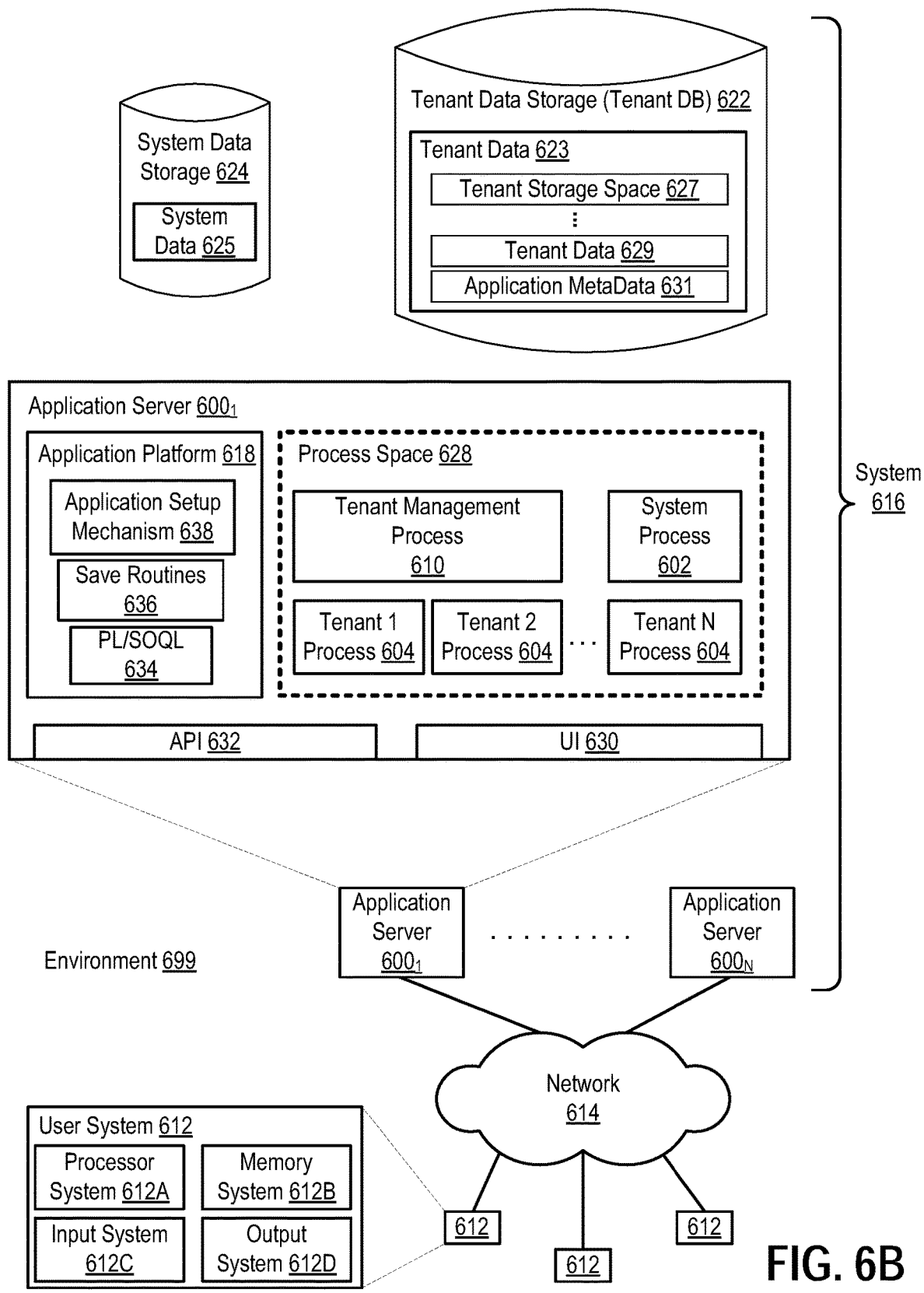
FIG. 6B illustrates another block diagram of an embodiment of elements of FIG. 6A and various possible interconnections between such elements in accordance with the described embodiments.

FIG. 6B illustrates another block diagram of an embodiment of elements of FIG. 6A and various possible interconnections between such elements in accordance with the described embodiments. FIG. 6B also illustrates environment 699. However, in FIG. 6B, the elements of system 616 and various interconnections in an embodiment are illustrated in further detail. More particularly, FIG. 6B shows that user system 612 may include a processor system 612A, memory system 612B, input system 612C, and output system 612D. FIG. 6B shows network 614 and system 616. FIG. 6B also shows that system 616 may include tenant data storage 622, having therein tenant data 623, which includes, for example, tenant storage space 627, tenant data 629, and application metadata 631. System data storage 624 is depicted as having therein system data 625. Further depicted within the expanded detail of application servers $600_{1-N}$ are User Interface (UI) 630, Application Program Interface (API) 632, application platform 618 includes PL/SOQL 634, save routines 636, application setup mechanism 638, process space 628 includes system process space 602, tenant 1-N process spaces 604, and tenant management process space 610. In other embodiments, environment 699 may not have the same elements as those listed above and/or may have other elements instead of, or in addition to, those listed above.

User system 612, network 614, system 616, tenant data storage 622, and system data storage 624 were discussed above in FIG. 6A. As shown by FIG. 6B, system 616 may include a network interface 620 (of FIG. 6A) implemented as a set of HTTP application servers 600, an application platform 618, tenant data storage 622, and system data storage 624. Also shown is system process space 602, including individual tenant process spaces 604 and a tenant management process space 610. Each application server 600 may be configured to tenant data storage 622 and the tenant data 623 therein, and system data storage 624 and the system data 625 therein to serve requests of user systems 612. The tenant data 623 might be divided into individual tenant storage areas (e.g., tenant storage space 627), which can be either a physical arrangement and/or a logical arrangement of data. Within each tenant storage space 627, tenant data 629, and application metadata 631 might be similarly allocated for each user. For example, a copy of a user's most recently used (MRU) items might be stored to tenant data 629. Similarly, a copy of MRU items for an entire organization that is a tenant might be stored to tenant storage space 627. A UI 630 provides a user interface and an API 632 provides an application programmer interface into system 616 resident processes to users and/or developers at user systems 612. The tenant data and the system data may be stored in various databases, such as one or more Oracle™ databases.

Application platform 618 includes an application setup mechanism 638 that supports application developers' creation and management of applications, which may be saved as metadata into tenant data storage 622 by save routines 636 for execution by subscribers as one or more tenant process spaces 604 managed by tenant management process space 610 for example. Invocations to such applications may be coded using PL/SOQL 634 that provides a programming language style interface extension to API 632. Invocations to applications may be detected by one or more system processes, which manages retrieving application metadata 631 for the subscriber making the invocation and executing the metadata as an application in a virtual machine.

Each application server 600 may be communicably coupled to database systems, e.g., having access to system data 625 and tenant data 623, via a different network connection. For example, one application server 600*i* might be coupled via the network 614 (e.g., the Internet), another application server 600N-1 might be coupled via a direct network link, and another application server 600N might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 612 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user may hit three different application servers 600, and three requests from different users may hit the same application server 600. In this manner, system 616 is multi-tenant, in which system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 600 to request and update system-level and tenant-level data from system 616 that may require sending one or more queries to tenant data storage 622 and/or system data storage 624. System 616 (e.g., an application server 600 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 7:
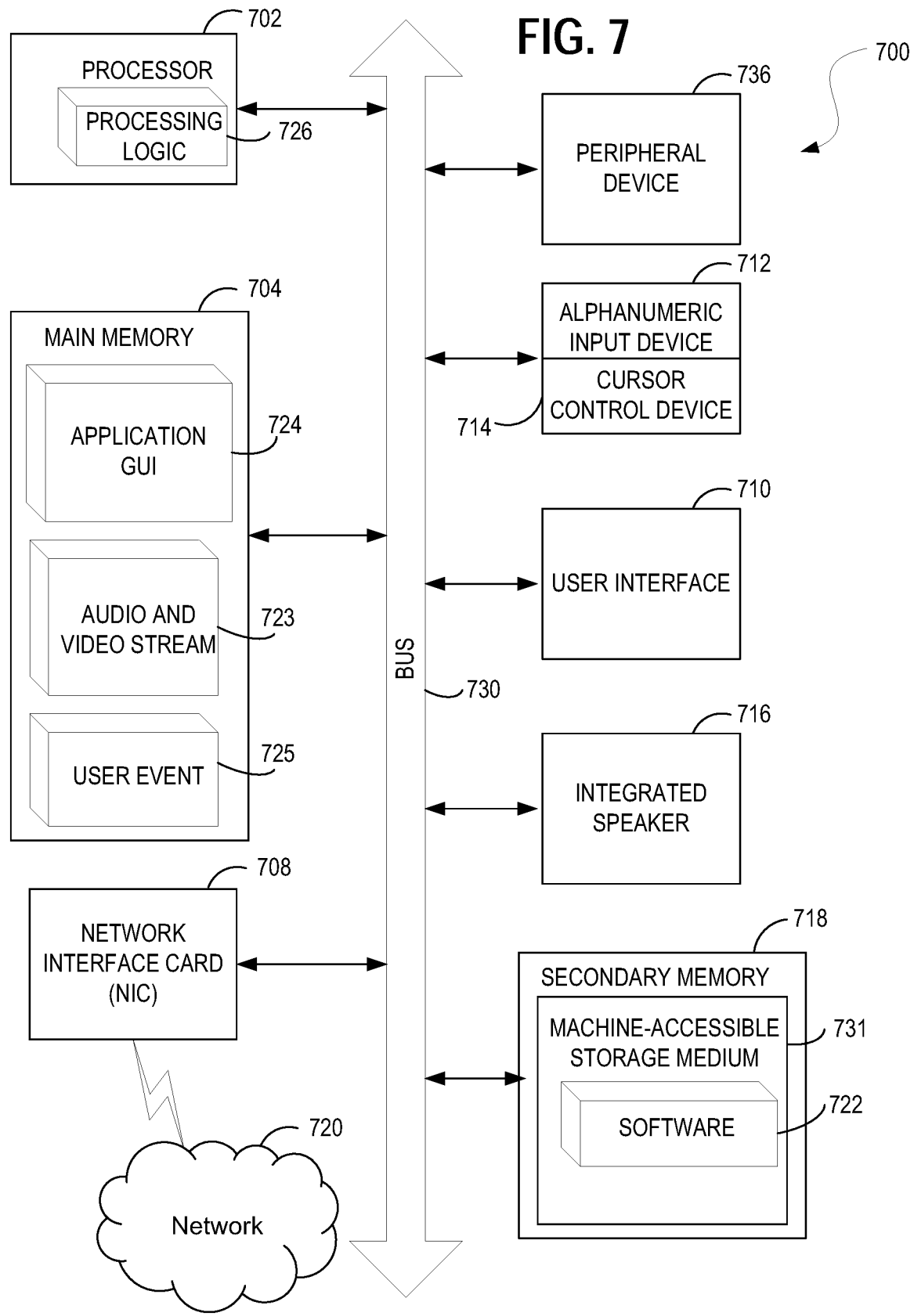
FIG. 7 illustrates a diagrammatic representation of a machine in the exemplary form of a computer system, in accordance with one embodiment.

FIG. 7 illustrates a diagrammatic representation of a machine 700 in the exemplary form of a computer system, in accordance with one embodiment, within which a set of instructions, for causing the machine/computer system 700 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 718 (e.g., a persistent storage device including hard disk drives and a persistent database and/or a multi-tenant database implementation), which communicate with each other via a bus 730. Main memory 704 includes an application GUI 724 to present information to a user as well as receive user inputs. Main memory 704 includes an audio video stream 723, such as that received by a communications interface (e.g., NIC 708) from a remote service, and main memory 704 further includes user event 725 to be received at the application GUI 725 and trigger the user initiated service call in accordance with the embodiments described herein. Main memory 704 and its sub-elements are operable in conjunction with processing logic 726 and processor 702 to perform the methodologies discussed herein.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations and functionality which is discussed herein.

The computer system 700 may further include a network interface card 708. The computer system 700 also may include a user interface 710 (such as a video display unit, a liquid crystal display (LCD), or a cathode ray tube (CRT)), an alphanumeric input device 712 (e.g., a keyboard), a cursor control device 714 (e.g., a mouse), and a signal generation device 716 (e.g., an integrated speaker). The computer system 700 may further include peripheral device 736 (e.g., wireless or wired communication devices, memory devices, storage devices, audio processing devices, video processing devices, etc.).

The secondary memory 718 may include a non-transitory machine-readable storage medium or a non-transitory computer readable storage medium or a non-transitory machine-accessible storage medium 731 on which is stored one or more sets of instructions (e.g., software 722) embodying any one or more of the methodologies or functions described herein. The software 722 may also reside, completely or at least partially, within the main memory 704 and/or within the processor 702 during execution thereof by the computer system 700, the main memory 704 and the processor 702 also constituting machine-readable storage media. The software 722 may further be transmitted or received over a network 720 via the network interface card 708.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A user client device comprising:
    a memory and a processor to execute instructions at the user client device;
    an application to execute upon the user client device via the processor and the memory;
    an audio interface;
    a Graphical-User-Interface (GUI) to display the application and receive a user event triggering a user initiated service call to the remote service over a network;
    a communications interface to link the user client device with a remote service over the network and to receive an audio-video stream from the remote service via the network responsive to the triggering of the user initiated service call, the audio-video stream transmitting video of a Customer-Service-Agent (CSA) and establishing two-way audio-communication between the user client device and the remote service, the communications interface transmitting audio from the user client device to the remote service and transmitting a representation of the application displayed via the GUI to the remote service to enable the CSA to view and manipulate an on-screen element of the application displayed via the GUI of the user client device subject to a restriction for a set of sub-features of the on-screen element that permits the CSA to access the sub-feature of viewing a text box of the application via the representation transmitted to the remote service and further permits the CSA to operate the sub-features of interacting with the text box displayed to the GUI of the user client device via clicking, highlighting text, and copying text, but prohibits the CSA from writing to the text box pursuant the restriction; and
    wherein the set of sub-features of the on-screen element are unrestricted for access and operation for local user inputs of the client device.

2. The user client device of claim 1, wherein the GUI sends a request to the remote service via the communications interface;
    the remote service receives the request from the user client device and responsively displays the request at an operator terminal of the remote service; and
    wherein the communications interface to receive the audio and video stream from the remote service via the network responsive to the triggering of the user initiated service call comprises the communications interface to receive the audio and video stream from the remote service contingent upon the request having been accepted at the terminal of the remote service.

3. The user client device of claim 1, wherein the user initiated service call to the remote service comprises a user initiated SOS type distress call requesting service, assistance, or support from the remote service.

4. The user client device of claim 1, wherein the GUI to receive the user event within the application comprises:
    an SOS button as a component of the GUI established by the application, the GUI to receive a click, touch, swipe, or other user gesture event at the SOS button displayed programmatically triggering the user initiated service call to the remote service.

5. The user client device of claim 1 wherein the communications interface to receive an audio and video stream from the remote service via the network receives the video stream;

wherein the GUI displays upon the user client device a live video feed of the CSA affiliated with the remote service.

6. The user client device of claim 5, wherein the live video feed of the CSA is superimposed within a movable overlay box on top of the GUI established by the application and concurrently displayed by the GUI of the user device.

7. The user client device of claim 1, wherein the two-way audio-communication between the user client device and the remote service comprises:

the audio interface of the user client device emitting voice communication of the CSA captured at an operator terminal of the remote service and transmitted to the user client device within the audio-video stream; and the audio interface of the user client device further capturing voice communication of a user captured by the audio interface of the user client device for transmission to the operator terminal at the remote service within the audio-video stream.

8. The user client device of claim 1:

wherein the audio-video stream from the remote service is restricted to the two-way audio-communication only without video transmission or receipt within the audio-video stream when available transmission bandwidth accessible via the communications interface falls below a first threshold, or wherein the audio-video stream from the remote service is restricted to the two-way audio-communication with a still image or a sub-sampling of a video portion of the audio-video stream from the remote service when the available transmission bandwidth accessible via the communications interface falls below a second threshold, or wherein the audio-video stream from the remote service is provided with the two-way audio-communication and the video portion of the audio-video stream in an unrestricted form when the available transmission bandwidth accessible via the communications interface is above a third threshold.

9. The user client device of claim 1, further comprising:
a video capture device to capture and transmit via the communications interface an outgoing video stream of a user as captured by the video capture device of the user client device for transmission to an operator terminal at the remote service concurrently with the two-way audio-communication established by the communications interface between the user client device and the remote service.

10. The user client device of claim 1, wherein the user client device is embodied within one of a laptop computer, a mobile client device, a smartphone, or tablet client device having a touch interface integrated within the user client device to display and to receive user input events at the GUI.

11. The user client device of claim 1:

wherein the representation of the application as displayed via the GUI of the user client device having been transmitted to the remote service further designates portions of the GUI displayed to the user client device as private or not private; and wherein the portions of the GUI designated as not private are shared with the customer service agent within the representation; and wherein the portions of the GUI designated as private are not shared with the customer service agent within the representation.

12. The user client device of claim 1:

wherein the representation of the application as displayed via the GUI of the user client device having been transmitted to the remote service further designates portions of the GUI displayed to the user client device as closed or open; and wherein the portions of the GUI designated as open are exposed to the customer service agent via the transmitted representation; and wherein the portions of the GUI designated as closed are not shared with the customer service agent within the representation.

13. The user client device of claim 1:

wherein the representation of the application as displayed via the GUI of the user client device having been transmitted to the remote service further maps specific portions of the GUI displayed to the user client device and designates the mapped portions of the GUI as closed or open; and wherein the portions of the GUI designated as open are permissibly shared with the customer service agent via the transmitted representation; and wherein the mapped portions of the GUI designated as closed are prevented from being displayed to the customer service agent.

14. The user client device of claim 1:

wherein the representation of the application as displayed via the GUI of the user client device having been transmitted to the remote service further designates portions of the GUI displayed to the user client device as private; and wherein the portions of the GUI designated as private contain one or more of sensitive information, personal information, financial information, or medical information; and wherein the portions of the GUI designated as private are shielded or hidden from being displayed to the customer service agent.

15. The user client device of claim 1:

wherein the representation of the application as displayed via the GUI of the user client device having been transmitted to the remote service further designates portions of the GUI displayed to the user client device as private; and wherein the portions of the GUI designated as private are obfuscated from display to the customer service agent by one or more of blurring, blacking out, non-display of a graphical element to the customer service agent, or displaying an encrypted version of text or information within the portions of the GUI designated as private at the representation transmitted to the customer service agent.

16. The user client device of claim 1:

wherein the representation of the application as displayed via the GUI of the user client device having been transmitted to the remote service further designates portions of the GUI displayed to the user client device as private; and wherein the portions of the GUI designated as private are dictated by a user for the user client device as private or non-private via configurable settings to control the designations by the user with within the application.

17. The user client device of claim 1:
wherein the representation of the application as displayed via the GUI of the user client device having been transmitted to the remote service further determines portions of the GUI displayed to the user client device are private; and
wherein the portions of the GUI conforming to a specified field, mask, or pattern are obfuscated and prevented from display to the customer service agent.

18. The user client device of claim 1:
wherein the representation of the application as displayed via the GUI of the user client device transmitted to the remote service further determines portions of the GUI displayed to the user client device are private; and
wherein the portions of the GUI conforming to a specified field, mask, or pattern are obfuscated and prevented from display to the customer service agent.

19. A computer-implemented method to execute within a user client device having at least a processor and a memory therein, wherein the computer-implemented method comprises:
executing an application at the user client device via the processor and the memory;
presenting a Graphical User Interface (GUI) established by the application at a display of the user client device;
receiving a user event within the application triggering a user initiated service call to a remote service;
communicably interfacing the application of the user client device with a remote service over the network and to receive an audio-video stream from the remote service via the network responsive to the triggering of the user initiated service call, the audio-video stream transmitting video of a Customer-Service-Agent (CSA) and establishing two-way audio-communication between the user client device and the remote service;
transmitting audio from the user client device to the remote service and transmitting a representation of the application displayed via the GUI to the remote service to enable the CSA to view and manipulate an on-screen element of the application displayed via the GUI of the user client device subject to a restriction for a set of sub-features of the on-screen element that permits the CSA to access the sub-feature of viewing a text box of the application via the representation transmitted to the remote service and permits the CSA to operate the sub-features of interacting with the text box displayed to the GUI of the user client device via clicking, highlighting text, and copying text, but prohibits the CSA from writing to the text box pursuant the restriction; and
wherein the set of sub-features of the on-screen element are unrestricted for access and operation for local user inputs of the client device.

20. The computer-implemented method of claim 19:
wherein the user initiated service call to the remote service comprises a user initiated SOS type distress call requesting service, assistance, or support from the remote service.

21. Non-transitory computer readable storage media having instructions stored thereon that, when executed by a processor of a user client device, cause the user client device to perform operations comprising:
executing an application at the user client device via the processor and the memory;
presenting a Graphical User Interface (GUI) established by the application at a display of the user client device;
receiving a user event within the application triggering a user initiated service call to a remote service;
communicably interfacing the application of the user client device with a remote service over the network and to receive an audio-video stream from the remote service via the network responsive to the triggering of the user initiated service call, the audio-video stream transmitting video of a Customer-Service-Agent (CSA) and establishing two-way audio-communication between the user client device and the remote service;
transmitting audio from the user client device to the remote service and transmitting a representation of the application displayed via the GUI to the remote service to enable the CSA to view and manipulate an on-screen element of the application displayed via the GUI of the user client device subject to a restriction for a set of sub-features of the on-screen element that permits the CSA to access the sub-feature of viewing a text box of the application via the representation transmitted to the remote service and permits the CSA to operate the sub-features of interacting with the text box displayed to the GUI of the user client device via clicking, highlighting text, and copying text, but prohibits the CSA from writing to the text box pursuant the restriction; and
wherein the set of sub-features of the on-screen element are unrestricted for access and operation for local user inputs of the client device.

22. The non-transitory computer readable storage media of claim 21:
wherein the user initiated service call to the remote service comprises a user initiated SOS type distress call requesting service, assistance, or support from the remote service.

* * * * *